Aug. 26, 1958
R. McCOMBS
2,849,202
POLE SUPPORT
Filed July 20, 1954
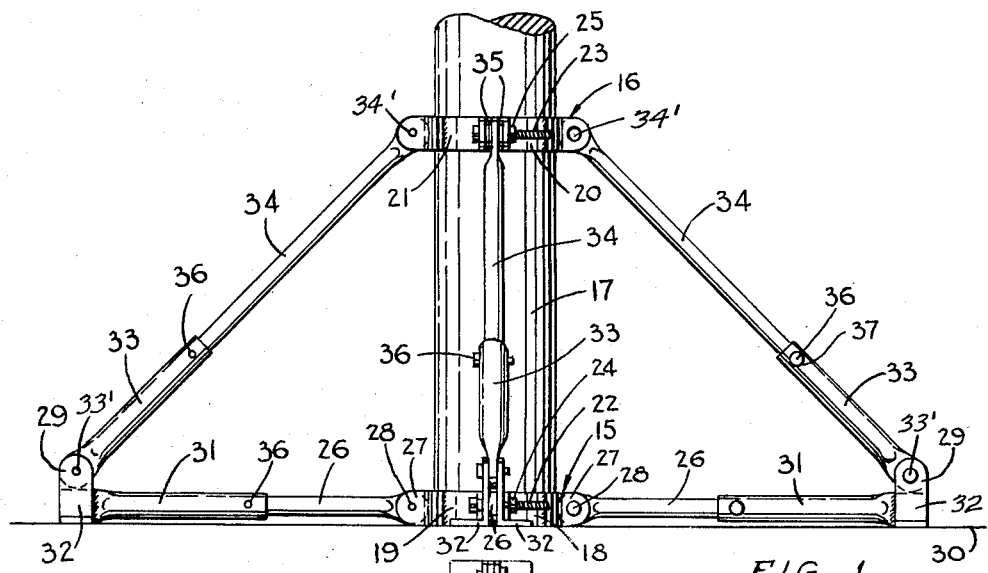
FIG. 1
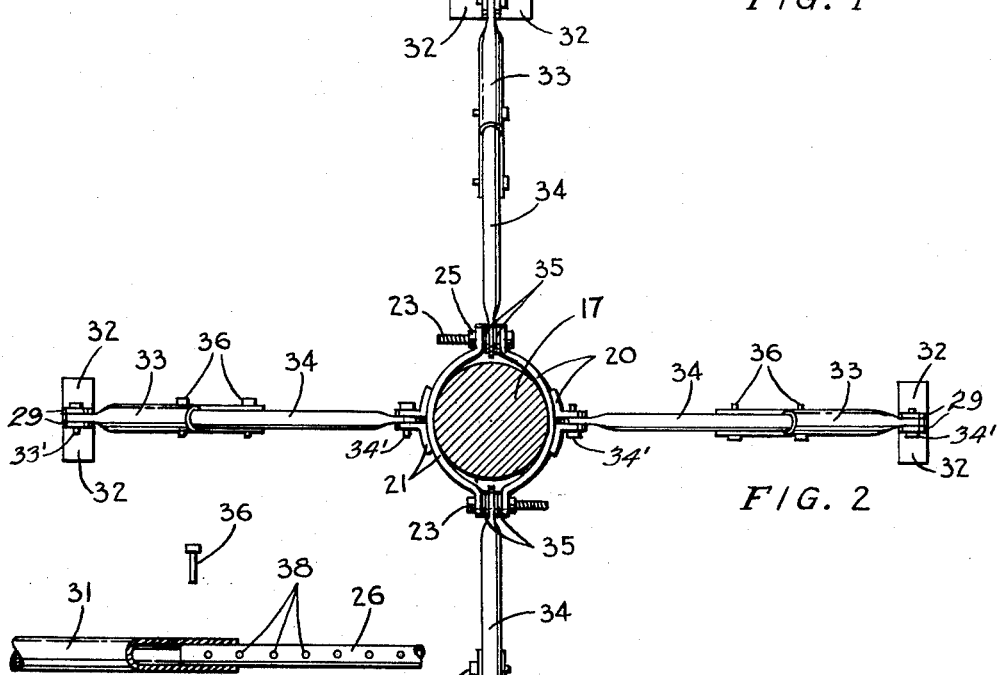
FIG. 2
FIG. 3
ROY McCOMBS
INVENTOR.
BY
McMorrow, Berman & Davidson
ATTORNEYS

2,849,202

POLE SUPPORT

Roy McCombs, Covelo, Calif.

Application July 20, 1954, Serial No. 444,500

1 Claim. (Cl. 248—44)

This invention relates to improvements in supports for poles.

An object of the invention is to provide a support for holding a pole in an upstanding position, which support is adjustable to fit poles of different diameters and to meet varying conditions of support imposed by the height and weight of the pole, the character of the supporting surface and the contour of surrounding supporting surface.

Other objects and advantages of the invention will appear from the following description considered in conjunction with the attached drawings in which:

Figure 1 is a side elevational view of a support of the present invention mounted in operative position upon a pole;

Figure 2 is a top plan view;

Figure 3 is a detailed view, partially in section, showing the extensible feature of the arms and legs of the support of the present invention.

Referring to the drawings, the illustrated device comprises a pair of collars 15 and 16, respectively, arranged in vertically spaced relation and adapted to embracingly engage an upstanding pole, designated 17. Each of the collars 15 and 16 embodies a pair of arcuate shaped half-sections 18, 19 and 20, 21, arranged in face to face relation and means consisting of bolts 22, 22 and 23, 23 connecting the facing ends of the half sections 18 and 19 and the half sections 20 and 21 together, respectively. The half sections 18 and 19 are provided with ears at their ends which are in parallel relation when the half sections are arranged in face to face relation and one of the bolts 22 extends through each adjacent pair of ears, a nut 24 engaging the shank of each bolt 22 to connect the half sections 18 and 19 together subject to adjustment toward and away from each other to accommodate poles of different diameters. The half sections 20 and 21 of the upper collar 16 are similarly connected together by the bolts 23 and nuts 25. The bolts 22, 22 and 23, 23 have shanks of substantial length to permit the spacing of the connected ends of the half sections 18 and 19 and 20 and 21 to accommodate the collars 15 and 16 to poles of greater diameter than would be possible if the ends of each pair of half sections were held in actual contact.

Projecting outwardly in spoke-like relation from the lower collar 15, is a plurality of arms 26, arranged at equal angles about the collar 15 and each pivotally connected, at its inner end, to the collar 15. One of the arms 26 is pivoted at its inner end upon one of the bolts 22, being mounted slidably as well as pivotally upon the portion of the shank of the bolt 22 between the ears of the half sections 18 and 19. A plurality of washers 35 are disposed upon the bolt 22 contiguous to each side of the related arm 26 to center the arm 26 between the adjacent ears of the half sections 18 and 19. Another of the arms 26 is similarly mounted upon the other bolt 22. The other arms 26 are connected to the mid-portions of the half sections 18 and 19, the connected end of each such other arm 26 being inserted between a pair of spaced ears 27 projecting from the outer surface of the complemental half section, and being connected to the ears 27 by a pivot pin 28.

Slidably telescoped on the free end of each of the lower arms 26 is a tubular shank 31 having an outer end secured between a pair of spaced L-shaped feet 32 having standards 29 rising above the shank 31. Slidably engaged on the outer ends of the upper arms 34 are tubular shanks 33 having their outer or lower ends pivoted at 33' between the upstanding standards 29 of the feet 32 above the shanks 31 on the lower arms 26.

The upper arms 34 have upper ends pivotally connected to the upper collar 16 at 34'. One of the arms 34 is pivoted on one of the bolts 23 in the same manner in which lower arms 26 are pivoted on the bolts 22 of the lower collar 15. Similarly, a plurality of washers 35 are carried upon the shanks of the bolts 23 to space the related arms 34 centrally between the flanges of the half sections 20 and 21 of the upper collar.

Means are provided for securing the lower ends of the arms 26 to the related shanks 31 at selected points therealong and for securing the outer ends of the upper arms 34 to the related shank 33 at selected points therealong.

The securing means is similar for the arms 26 and 34 and consists of a pin 36 inserted through an aperture 37 in shank 31 or 33, and selectively through any one of a plurality of apertures 38 spaced along the related arm 26 or 34, to secure the related arm 26 or 34 to the shanks 31 or 33, respectively, so that the arms 26 and 34 can be secured in desired extended or contracted positions.

To use the support of the present invention to support a pole, 17, the half sections 18 and 19 of the lower collar are first placed about the pole 17, adjacent the ground surface. The ends of the arms 26, to be attached to the bolts 22, are then put in place between the flanges at each end of the sections 18 and 19 and the bolts 22 are inserted. A sufficient number of washers 35 is placed between each side of the arm end and the adjacent flanges to space the arm 26 centrally between the flanges.

In a similar manner, the two half sections 20 and 21 of the upper collar and the upper arms 34 to be connected to the bolts 23 are then assembled to the sections 18 and 19, and spacing washers are placed upon the bolts 23 to space the arms 34 centrally between the flanges of the half sections 20 and 21.

The outer ends of the lower arms 26 are then inserted into the tubular shanks 31 and the upper collar 16 is raised upon the pole 17 and the free ends of the arms 34 inserted into the shanks 33. The collars 15 and 16 are the adjusted to the best supporting positions upon the pole 17, and the arms 26 and 34 being moved into and out of the related shanks 31 and 33 to adapt the support to the spacing of the collars 15 and 16 and to the contour of the ground around the lower end of the pole 17. The pins 36 are then put in place and the nuts 24 and 25 are tightened to complete the setting up of the support. When the support is to be taken down, the bolts 22 and 23 are removed and the support is separated into two sections and the arms 26 and 34 removed from the collar bolts.

The adjustability in the effective length of the arms 26 and 34, makes possible the adaptation of the support to a sloping or irregular contour of the ground surface around the lower end of the pole and to other special conditions arising from the character of the pole and the ground area on which it is supported.

What is claimed is:

In a device for supporting a pole upon a surface, a lower pole embracing collar to rest upon the surface, lower arms having inner ends pivoted to the lower collar and having outer ends, said lower arms normally occupy horizontal positions, feet mounted on the outer ends of said lower arms comprising surface engaging portions below said lower arms and standard portions rising above said lower arms, an upper pole embracing collar spaced above said lower collar, upper outwardly declining arms having inner ends pivoted to said upper collar and outer ends pivoted to said standard portions of the feet on a level above said lower arms, each of said upper and lower arms consisting of a relatively stationary inner section and a longitudinally adjustable outer section telescopically engaged with the inner section, said outer sections of the lower arms having outer ends on which said feet are fixed, and locking means acting between the inner and outer sections of the upper and lower arms for locking the sections in adjusted longitudinal relation to each other.

References Cited in the file of this patent

UNITED STATES PATENTS

| | | |
|---|---|---|
| 952,655 | Wagner | Mar. 22, 1910 |
| 1,030,938 | Stamps | July 2, 1912 |
| 1,064,798 | Walte | June 17, 1913 |
| 1,680,050 | Keppens | Aug. 7, 1928 |
| 2,031,097 | Bucky | Feb. 18, 1936 |
| 2,282,285 | Olson | May 5, 1942 |
| 2,388,287 | Richardson | Nov. 6, 1945 |
| 2,584,713 | Kanaval | Feb. 5, 1952 |

FOREIGN PATENTS

| | | |
|---|---|---|
| 1,038,351 | France | May 6, 1953 |